United States Patent
Courtenay et al.

(10) Patent No.: US 7,062,382 B2
(45) Date of Patent: Jun. 13, 2006

(54) VIDEO ENHANCED STABILITY CONTROL IN ROAD VEHICLES

(75) Inventors: William John Andres Courtenay, Dereham (GB); Mark Richard Tucker, Lutterworth (GB)

(73) Assignee: TRW Limited (GB)

( * ) Notice: Subject to any disclaimer, the term of this patent is extended or adjusted under 35 U.S.C. 154(b) by 0 days.

(21) Appl. No.: 11/119,537

(22) Filed: Apr. 29, 2005

(65) Prior Publication Data

US 2005/0246101 A1  Nov. 3, 2005

Related U.S. Application Data

(63) Continuation of application No. PCT/GB2003/004570, filed on Oct. 24, 2003.

(30) Foreign Application Priority Data

Oct. 30, 2002  (GB) ................................ 0225192.4

(51) Int. Cl.
G06F 17/10  (2006.01)
B60T 8/24  (2006.01)
G05B 19/10  (2006.01)

(52) U.S. Cl. .................. 701/301; 701/300; 303/146; 318/190; 318/146; 318/567

(58) Field of Classification Search .................. 701/28, 701/24–25, 36, 41, 70, 48, 300–301; 348/148; 303/146; 318/190, 146, 567; B60T 8/00, B60T 8/24, 8/60; B62D 6/04, 1/28, 15/02; G05D 1/02; G05B 19/10; G06F 17/10

See application file for complete search history.

(56) References Cited

U.S. PATENT DOCUMENTS

| 3,015,457 | A | * | 1/1962 | Dixson ...................... 244/3.16 |
| 4,566,032 | A | * | 1/1986 | Hirooka et al. ............. 348/119 |
| 4,773,017 | A | * | 9/1988 | Murgue et al. ................ 701/4 |
| 5,762,160 | A | * | 6/1998 | Shimizu ..................... 180/446 |
| 5,987,364 | A | * | 11/1999 | Le Gusquet et al. .......... 701/24 |
| 6,185,492 | B1 | * | 2/2001 | Kagawa et al. ............... 701/41 |
| 6,219,609 | B1 | * | 4/2001 | Matsuno et al. .............. 701/72 |
| 6,282,478 | B1 | * | 8/2001 | Akita .......................... 701/70 |
| 6,427,114 | B1 | * | 7/2002 | Olsson ....................... 701/117 |
| 6,449,383 | B1 | * | 9/2002 | Oike et al. .................. 382/104 |

(Continued)

FOREIGN PATENT DOCUMENTS

DE  199 22 979  *  5/1999

(Continued)

OTHER PUBLICATIONS

Whitfield, Danger Ahead, from Automotive Design & Production, unknown date, 4 pages.*

(Continued)

*Primary Examiner*—Cuong Nguyen
(74) *Attorney, Agent, or Firm*—MacMillan, Sobanski & Todd, LLC

(57) ABSTRACT

A stability control system for road vehicles comprising a limit handling assistance controller which uses video lane detection measurements in conjunction with vehicle dynamics information, including inertial brakes and steering measurements to control vehicle EPS and VSC systems to assist the driver stabilize the vehicle and correct for any lane offset prior to and/or during of understeer, oversteer, split-μ and heavy breaking conditions, and lane changes.

15 Claims, 3 Drawing Sheets

U.S. PATENT DOCUMENTS

| | | | |
|---|---|---|---|
| 6,556,909 B1 * | 4/2003 | Matsumoto et al. | 701/41 |
| 6,577,334 B1 * | 6/2003 | Kawai et al. | 348/148 |
| 6,595,602 B1 * | 7/2003 | Jokic et al. | 303/147 |
| 6,622,076 B1 | 9/2003 | Eckert et al. | |
| 6,647,328 B1 * | 11/2003 | Walker | 701/36 |
| 6,721,645 B1 * | 4/2004 | Lueder et al. | 701/93 |
| 6,763,904 B1 * | 7/2004 | Winner et al. | 180/167 |
| 6,803,736 B1 * | 10/2004 | Hommel et al. | 318/567 |
| 6,895,126 B1 * | 5/2005 | Di Bernardo et al. | 382/284 |
| 2001/0056544 A1 * | 12/2001 | Walker | 713/200 |
| 2002/0007239 A1 * | 1/2002 | Matsumoto et al. | 701/41 |
| 2002/0138192 A1 * | 9/2002 | Lueder et al. | 701/93 |
| 2002/0156580 A1 * | 10/2002 | Matsuura | 701/301 |
| 2002/0156581 A1 * | 10/2002 | Matsuura | 701/301 |
| 2002/0180265 A1 * | 12/2002 | Jokic et al. | 303/146 |
| 2003/0093187 A1 * | 5/2003 | Walker | 701/1 |

FOREIGN PATENT DOCUMENTS

| | | | |
|---|---|---|---|
| DE | 100 19 152 | * | 4/2000 |
| EP | 1 129 917 | | 9/2001 |
| WO | 00/61413 | | 10/2000 |

OTHER PUBLICATIONS

Whitfield, Electric Steering Gets a Boost, Automotive Design & Production, Jun. 14, 2005.*

Alan Williams, slides of "Electric ancillaries for hybrid and electric vehicles", Fabian Research Network, Oct. 13, 2004, Venue, MIRA.*

* cited by examiner

VIDEO ENHANCED STABILITY CONTROL IN ROAD VEHICLES

CROSS REFERENCE TO RELATED APPLICATIONS

This application is a continuation of International Application No. PCT/GB2003/004570 filed Oct. 24, 2003, the disclosures of which are incorporated herein by reference, and which claimed priority to Great Britain Patent Application No. 0225192.4 filed Oct. 30, 2002, the disclosures of which are incorporated herein by reference.

BACKGROUND OF THE INVENTION

The present invention is concerned with stability control in road vehicles using a form of video based enhancement.

A so-called Active Torque Overlay (ATO) system has been developed recently which is based on the integration of EPS, (Electronic Power Steering) and ABS/VSC (Vehicle Stability Control) and is a method for injecting torque into the steering to adjust the steering feel or to assist the driver in limit/emergency manoeuvres. In this connection a "limit manoeuvre" is one which takes place at or near the vehicle handling limits.

The following scenarios that occur at or near the vehicle handling limits are benefited by ATO:

1. Oversteer.

In the early stages of oversteer, ATO acts to assist the driver to stabilise the vehicle. ATO demands an additional assist torque of the EPS. If oversteer develops past a defined threshold then VSC acts to stabilise the vehicle through brake intervention.

2. Understeer.

In the early stages of understeer, ATO acts to feedback information to the driver about the onset of understeer. ATO adjusts the assist torque of the EPS to exaggerate the reduction of rack force as felt by the driver via the steering wheel. This control is termed understeer haptic feedback. If understeer develops past a defined threshold then VSC acts, through brake intervention, to provide a yaw moment to maintain the perceived vehicle trajectory.

3. Split-µ Braking.

During a split-µ stop, a yaw moment due to the asymmetric longitudinal braking forces is generated on the vehicle. In passive vehicles the brake pressure build up is limited to allow the driver to apply the required steering correction to maintain a desired trajectory. The ATO control however assists the driver in balancing this yaw moment by applying a torque to the steering system to assist the driver achieve the required counter moment to stabilise the vehicle. Due to the improved stability, more aggressive braking and so reduced stopping distances can be achieved.

In all these scenarios, the control systems can restore or assist in the restoration of the stability of the vehicle and/or attempt to maintain a perceived trajectory. However they cannot guarantee that the vehicle is returned to the correct direction of travel as they have no means of detecting the direction of travel. Instead, the driver necessarily corrects the direction of travel.

Video lane detection systems are known to provide a means of detecting the direction of travel of a vehicle. Such lane detection systems have been used for several Driver Assistance Systems (DAS) functions, such as Lane Departure Warning, Lane Keeping and Autonomous Cruise Control (ACC) Target Selection.

BRIEF SUMMARY OF THE INVENTION

In accordance with one aspect, the present invention uses integration of the technologies of ATO and video lane detection to enhance vehicle control and to assist the driver in maintaining the correct direction of travel under limit handling conditions. The control strategies are termed herein "limit handling assistance" controllers.

The invention also provides a stability control system for road vehicles which is adapted to correct or compensate for lane or vehicle trajectory offsets, as would be imposed on a vehicle undergoing a dynamic state change, by means of offset detection using a video image processing system.

According to one embodiment of the present invention there is provided a stability control system for road vehicles comprising a limit handling assistance controller which uses video lane detection measurements in conjunction with vehicle dynamics information, including inertial, brakes and steering measurements, to control vehicle EPS and VSC systems to assist the driver stabilise the vehicle and/or correct for any lane offset prior to and/or during any of understeer, oversteer, split-µ and heavy braking conditions, and lane changes.

Preferably, in the case of an understeering vehicle condition detected by the vehicle VSC, an appropriate wheel is arranged to be braked to achieve a desired yaw rate in accordance with a driver's command expressed via the steering wheel, and in addition to decelerate the vehicle to reduce the understeer.

Advantageously, once the understeer has been reduced sufficiently for the front tyres to be no longer saturated, a torque is arranged to be demanded of the steering to assist the driver correct for any lane offsets detected by a video lane detection sensor providing said video lane detection measurements.

Preferably, for the purposes of preventative understeer or oversteer, the video lane detection measurements are used to obtain look-ahead information of a bend, the controller being arranged to demand brake intervention to decelerate the vehicle to an appropriate speed so that the bend can be safely negotiated without understeer or oversteer being provoked.

Preferably, in the case of an oversteering vehicle condition detected by the vehicle VSC, a torque is arranged to be applied to the steering to assist the driver stabilise the vehicle following which, if the oversteer progresses to a threshold, the VSC is arranged to brake an appropriate wheel to stabilise the vehicle and achieve a desired yaw rate in accordance with a driver command via the steering wheel.

Advantageously, during oversteer correction phases or oversteer control, an additional overlay torque is arranged to be demanded of the steering to assist the driver correct for lane offsets detected by a video lane detection sensor providing said video lane detection measurements.

Advantageously, during heavy braking while running in a lane, a torque can be demanded of the steering system using vehicle inertial, steering and video lane detection measurements to assist the driver stabilise the vehicle and keep the vehicle in that lane when undergoing said braking.

Preferably, in a split-µ stop, the driver is assisted to balance the yaw moment due to the asymmetric longitudinal braking force by demanding a torque to the steering system to assist the driver achieve the required counter moment.

Advantageously, an additional torque to assist the driver correct for lane offsets detected by the video lane detection sensors is used to augment the first mentioned torque.

Advantageously, when a lane change selected by the driver is detected by the video lane detection sensor in association with the steering and vehicle inertial sensors, a torque is arranged to be demanded of the steering system to assist the driver in making the lane change.

Other advantages of this invention will become apparent to those skilled in the art from the following detailed description of the preferred embodiment, when read in light of the accompanying drawings.

DETAILED DESCRIPTION OF THE INVENTION

Figure 1:
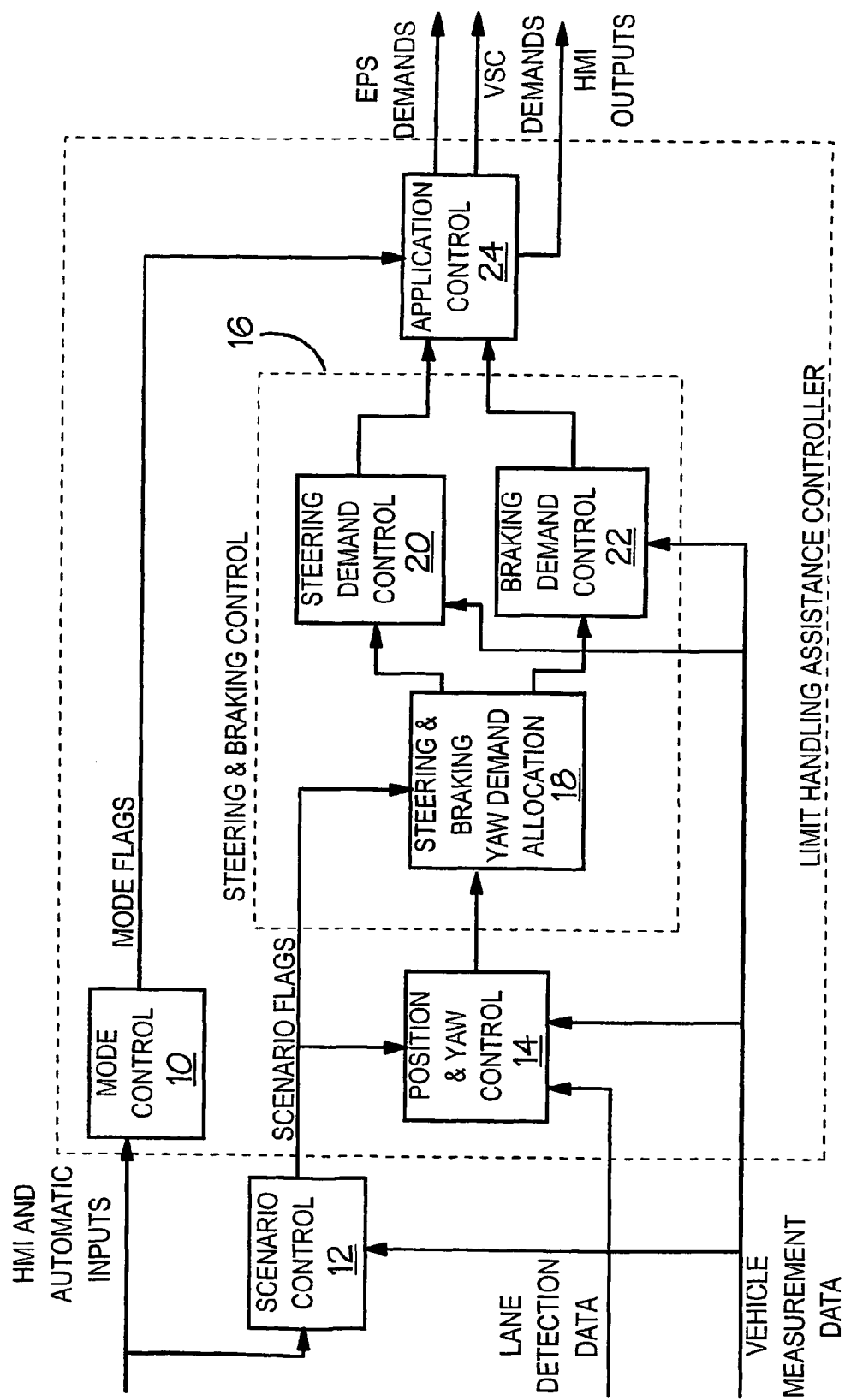
FIG. 1 is a block diagram representative of the control algorithm structure of a limit handling assistance controller which is generic to all of the aforegoing scenarios (a) to (e)

An assistance system in accordance with the invention makes use of video detection measurements from a video lane detection sensor which may, although not necessarily, be part of a lane guide (or lane departure warning) system. The EPS and VSC are combined with the lane detection to give driver assistance in any or all of the following scenarios:

(a) Understeer

In this scenario the VSC detects understeer (typically in a bend) and brakes the appropriate wheel (typically but not necessarily the rear inner) to achieve the desired yaw rate (as commanded by the driver through the steering wheel). Braking the wheels also acts to decelerate the vehicle. Reducing the speed of the vehicle reduces/helps to reduce the understeer. Once the understeer is reduced so that the front tyre forces are no longer saturated then a torque is demanded of the steering to assist the driver correct for the lane offsets detected by the video lane detection sensor.

(b) Preventative Understeer/Oversteer

In this scenario the video lane detection is used to obtain look-ahead information of a bend. The controller demands brake intervention to decelerate the vehicle to an appropriate speed so that the bend can safely be negotiated without understeer or oversteer being provoked. This strategy can be further enhanced with preview information obtained from a map based GPS system.

(c) Oversteer

An oversteer scenario is detected by the VSC. In a vehicle with ATO functionality, the first means for controlling the oversteer is via the steering where a torque is applied to the steering to assist the driver stabilise the vehicle. If the oversteer progresses to a threshold then the VSC brakes the appropriate wheel (typically but not necessarily the front outer) to stabilise the vehicle and achieve the desired yaw rate (as commanded by the driver through the steering wheel). The braking also reduces the speed of the vehicle. During and/or subsequent to the oversteer correction phases of the oversteer control, an additional overlay torque is demanded of the steering to assist the driver correct for the lane offsets detected by the video lane detection sensor.

(d) Braking

In some instances during heavy braking, a vehicle can become unstable. This is due to load transfer along the vehicle causing a reduction of the vertical force on the rear tyres and an increase in vertical force on the front tyres. This results in the rear tyres having a reduced force generating capability with the front tyres having an increased lateral force generating capability. Utilising vehicle inertial, steering and video lane detection measurements a torque is demanded of the steering system to assist the driver stabilise the vehicle and keep the vehicle in lane when undergoing such braking.

During a split-$\mu$ stop, the ATO controller assists the driver in balancing the yaw moment due to the asymmetric longitudinal braking forces by demanding a torque to the steering system to assist the driver achieve the required counter moment. An additional torque to assist the driver correct for lane offsets detected by the video lane detection sensor augments this torque.

(e) Lane Change Assistance

The video lane detection in association with the steering and vehicle inertial sensors detects a lane change. A torque is demanded of the steering system to assist the driver in making the lane change.

A vehicle can be provoked to oversteer in, for example severe lane changes (such as an emergency lane change). In a severe lane change, the lane change assistance reduces the likelihood of the vehicle oversteering. In extreme cases where the vehicle does oversteer (maybe provoked by a surface transition during a lane change) then control as detailed in (c) is applied.

In a lane change with braking, the brake force demanded is distributed in such a way as to provide a yaw moment to assist the driver in making the lane change.

Referring now to the control algorithm structure of FIG. 1, the use of scenario flags to control gains within the algorithm allows the controller to respond differently to each handling scenario. Hence, the single structure is suitable for all five scenarios (a) to (e) described hereinbefore.

By way of example of the implementation of the present system, a simple design example is now described for the oversteer case (c).

The system of FIG. 1 has the following inputs:

Vehicle Measurement Data

1. Steering wheel angle and rotational rate measurements received from the vehicle steering system.
2. Wheel speed measurements and brake pressure estimates/measurements from the vehicle braking systems (including for example a VSC system).
3. Yaw rate received from a vehicle inertial sensor.
4. Vehicle longitudinal velocity received from for example processed wheel speed measurements.

Lane Detection Data (from a Video Sensor)

5. Lateral position error from the centre of the lane.
6. Heading angle error from the centre of the lane.
7. Lane curvature.

HMI and Automatic Inputs

8. Human Machine Interface (HMI) inputs, (for example, on/off switch, activate switch, indicators).

9. Automated switches (for example, a safety monitoring system to detect component failure).

The system also has the following outputs:
1. Steering column torque demand to the steering (e.g an EPS system)
2. Brake pressure demands to the braking systems (e.g a VSC system)
3. Outputs to the HMI (for example, mode light, buzzer)

The various blocks in FIG. 1 are now described.

Mode Control Block (10)

The system mode (for example, "Active", "Off" or "Standby") may be set manually by the driver or automatically by another system (for example, a safety monitoring system to detect component failure). The mode flag is output to the Application Control Block.

Scenario Control Block (12)

The Scenario Control Block 12 may, for example, be located in the vehicle VSC system. The vehicle measurements and certain HMI inputs (for example, indicators) are used to estimate the vehicle's dynamic state (for example, understeer/oversteer/heavy braking) and the driver's intentions (for example, lane change). The output is a series of scenario flags that inform the controller of what vehicle control action is available. The scenario flag signals are output to the Position & Yaw Control Block and the Steering & Braking Control Block described below.

Position & Yaw Control Block (14)

The lane detection data and longitudinal velocity data are used to calculate the yaw rate required to return the vehicle to the centre of the lane. If the scenario flag indicates that a lane change is desired, then a suitable yaw rate is calculated for the lane transition.

Steering & Brake Control Block (16)

The Steering & Brake Control Block 16 comprises three main subsystems.

(a) Steering & Braking Yaw Demand Allocation Block (18)

The total yaw rate demanded by the Position & Yaw Rate Control Block 18 is proportioned to the steering and braking systems according to the scenario flags. The yaw rate demanded of the steering system is output to the Steering Demand Control Block 20. The yaw rate demanded of the braking system is output to the Braking Demand Control Block 22.

For example, if the scenario flag indicates that the vehicle is oversteering, then it may be more effective to brake a single wheel and steer than brake all four wheels and steer. Hence the yaw rate demand would be split in a certain proportion (determined from the scenario flags) between the braking system for the relevant wheel and the steering system.

(b) Steering Demand Control Block (20)

The steering yaw rate demand is compared to feedback measurements of the current steering wheel angle and rotational rate. The output is an assisting steering column torque demand that is passed to the EPS system.

(c) Braking Demand Control Block (22)

The braking yaw rate demand is compared to feedback estimates of the brake pressures. The outputs are brake pressure demands that are passed to the VSC system.

Application Control Block (24)

The Application Controller 24 works as a mode switch for the system and can also operate as a safety shutdown system. If the mode flag from the Mode Control Block 10 indicates that the system is "Active", then the steering and braking demands are transferred to the EPS and VSC systems. Otherwise, a zero output is given. HMI outputs are used to show the system's status to the driver.

There is now described a simple implementation of the algorithm structure shown in FIG. 1. Further enhancements (such as safety checks, validity checks and robustness to errors) are required in a production version, which add significant complication to the details of the system. Hence this example is given as an example only to illustrate the system's basic functionality. For this example, a typical oversteer scenario is used.

Position & Yaw Controller

Figure 2:
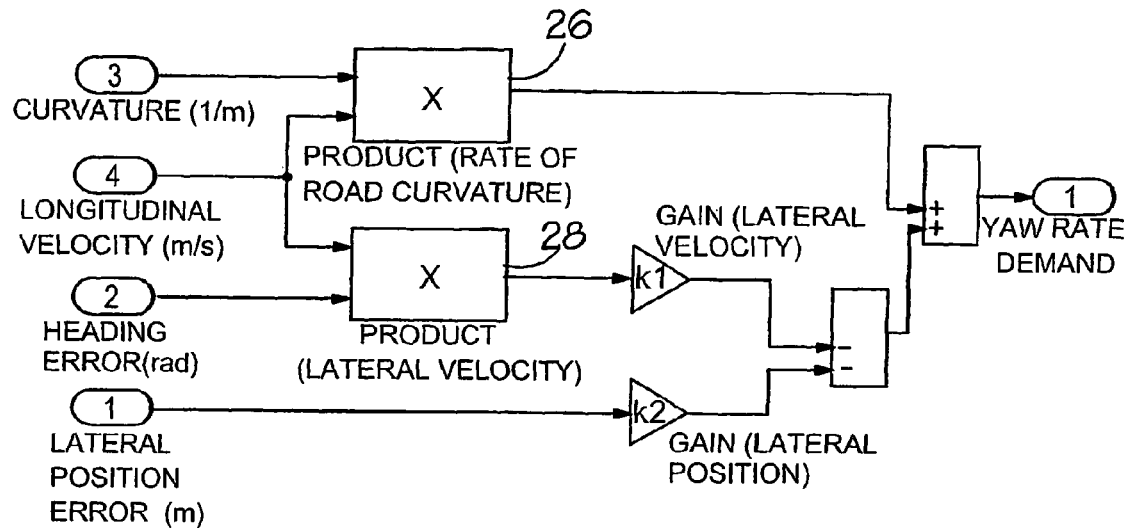
FIG. 2 is a block diagram of an in-lane position and yaw controller for use in the present invention.

The Position & Yaw Controller, 14 shown in FIG. 2 is suitable for all in-lane and lane-change scenarios. For lane-change scenarios, an offset equal to one lane's width is added to the lateral position error until the lane detection system indicates that the vehicle has crossed the lane boundary.

The rate of road curvature is calculated at block 26 using the product of road curvature and longitudinal velocity. This gives the vehicle yaw rate required to match the road curvature.

The lateral position error indicates what additional yaw rate is required to return the vehicle to the centre of the lane. The gain k2 is tuned to the vehicle characteristics and speed to give the desired response.

The product of longitudinal velocity and heading error at block 28 gives a measure of the lateral velocity in lane. This is fed via gain k1 (tuned to the vehicle characteristics and scheduled with vehicle speed) to provide damping to the error response.

The output yaw rate demand is the summation of the road curvature demand and the lateral position error demand.

Steering & Braking Yaw Demand Allocation

Figure 3:
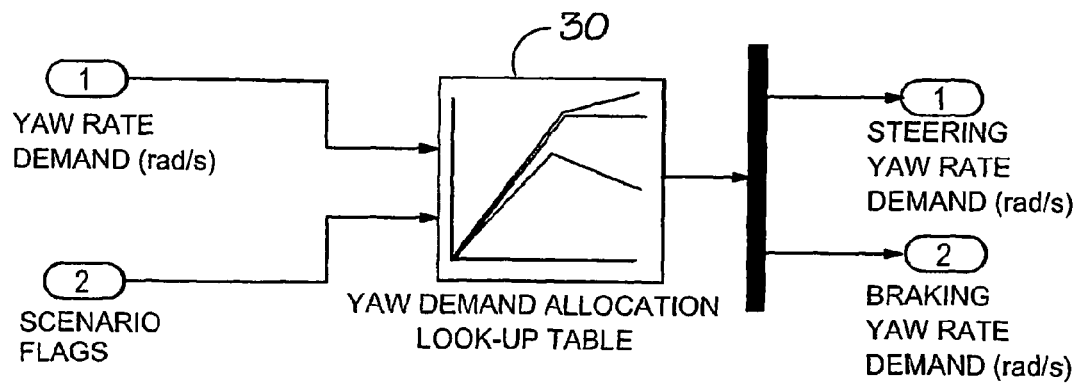
FIG. 3 is a schematic diagram illustrating steering and braking demand allocation.

The most effective way of achieving the demanded yaw rate is estimated using a look-up table 30, which acts as a series of gains that can be changed according to the scenario and vehicle speed. This divides the total input yaw rate demand into steering and braking yaw rate demands, as shown in FIG. 3.

In this simple oversteer example, the scenario flags might indicate that braking would be ineffective so the steering alone is required to achieve the total yaw rate demand. The look-up table outputs zeros for the braking demands and passes the yaw rate demand to the Steering Demand Controller.

Steering Demand Controller

The Steering Demand Controller 20 operates regardless of the current scenario, as this has already been accounted for earlier in the algorithm. Hence this controller is suitable for all scenarios where steering is required.

Figure 4:
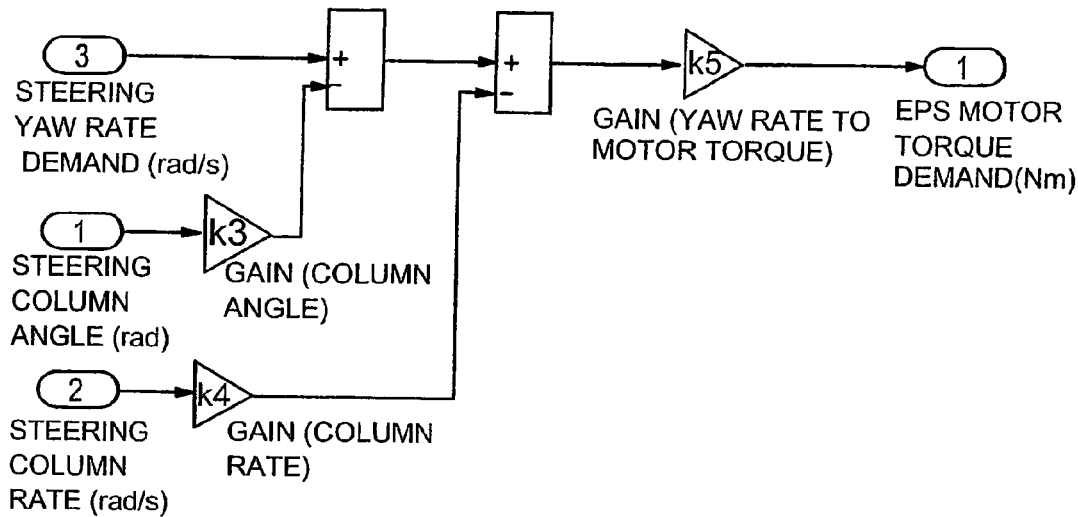
FIG. 4 is a schematic diagram of a steering demand controller.

Feedback from the steering column is used to design the desired response, as shown in FIG. 4. Gains k3 and k4 are tuned according to the vehicle characteristics and speed. The yaw rate error is then scaled to a motor torque demand by gain k5 (scheduled with vehicle speed).

The Braking Demand Controller 22 operates in a very similar way, using estimates of brake pressure feedback. A separate braking controller is used to control each wheel.

Application Controller

Figure 5:
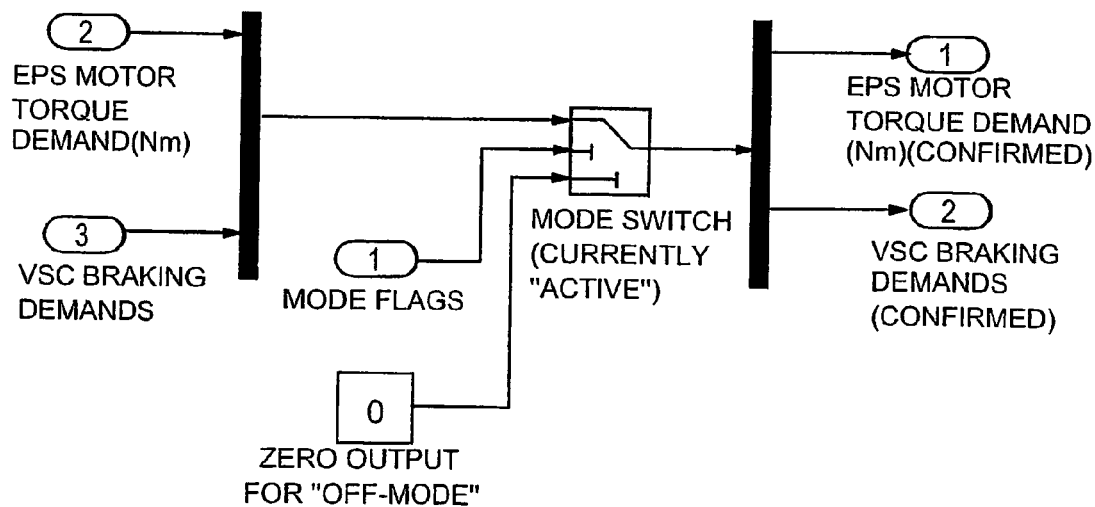
FIG. 5 is a schematic diagram of an application controller.

For this simple example, the Application Controller 24 works as an "ON/OFF" switch, as shown in FIG. 5. The default setting for the switch is "OFF" where zero output is fed on the EPS and VSC systems. If the mode flag indicates that the system is "Active", then the switch passes the steering and braking demands to the EPS and VSC systems.

As made clear above the current system has been described herein in its basic format. If, for example, better quality information about the surrounding environment is required, one approach can be to combine outputs from multiple sensors. For example, video requires a clear optical path. This is the primary limitation of the range of lane detection systems (~80 m). Navigation systems can be used to significantly enhance this range, as well as providing other useful information such as road gradient, speed limits and road curvature.

The functionality of the basic algorithm structure described herein shows how it is designed to be generic to all five handling scenarios. A more complete design will include other supporting subsystems, such as:

Safety and failsafe systems
Redundancy
Robustness to errors
Control refinements
Data validity checks However, the nature of these subsystems have not been described herein as they do not affect the functionality of the main controller system.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A stability control system for road vehicles comprising:
   a video image processing system; and
   a limit handling assistance controller connected to said video image processing system and which uses video lane detection measurements in conjunction with vehicle dynamics information, including inertial brakes and steering measurements, to control vehicle Electronic Power Steering (EPS) and Vehicle Stability Control (VSC) systems to assist the driver to stabilise the vehicle and correct for any lane offset both prior to and during at least one of the conditions of understeer, oversteer, split-µ and heavy breaking conditions, and lane changes, said limit handling assistance controller including:
      a scenario control which receives vehicle measurements and Human Machine Interface (HMI) inputs and estimates therefrom the dynamic state of the vehicle, such as understeer/oversteer/heavy braking, and the intentions of the driver, such as lane change, whereby to provide a series of scenario flags for use in informing the controller of what vehicle control action is available;
      a position and yaw rate control which receives vehicle measurement data and lane detection data and calculates one of a yaw rate required to return the vehicle to the centre of its lane and a yaw rate required for lane transition if a lane change flag is detected; and
      a steering and braking control which receives said calculated yaw rate and the vehicle measurement data and is operative to calculate steering and braking demands for transfer to the vehicle EPS and VSC systems.

2. A stability control system as claimed in claim 1, further including an application control device coupled to a mode control and acting as a mode switch for connecting the steering and braking demands produced by the steering and braking control to the vehicle EPS and VSC systems when said mode control indicates that the system is active.

3. A stability control system for road vehicles comprising:
   a video image processing system;
   a limit handling assistance controller connected to said video image processing system and which uses video lane detection measurements in conjunction with vehicle dynamics information, including inertial brakes and steering measurements, to control vehicle Electronic Power Steering (EPS) and Vehicle Stability Control (VSC) systems to assist the driver to stabilise the vehicle and correct for any lane offset both prior to and during at least one of the conditions of understeer, oversteer, split-µ and heavy breaking conditions, and lane changes, said limit handling assistance controller including:
      a scenario control which receives vehicle measurements and Human Machine Interface (HMI) inputs and estimates therefrom the dynamic state of the vehicle, such as understeer/oversteer/heavy braking, and the intentions of the driver, such as lane change, whereby to provide a series of scenario flags for use in informing the controller of what vehicle control action is available;
      a position and yaw rate control which receives vehicle measurement data and line detection data and calculates one of a yaw rate required to return the vehicle to the centre of its lane and a yaw rate required for lane transition if a lane change flag is detected; and
      a steering and braking control which receives said calculated yaw rate and the vehicle measurement data and is operative to calculate steering and braking demands for transfer to the vehicle EPS and VSC systems, said steering and braking control including:
         a steering and braking yaw demand allocator,
         a steering demand control, and
         a braking demand control, with said steering and braking yaw demand allocator proportioning said calculated yaw rate demanded by said position and yaw rate control to said steering demand control and said braking demand control according to said scenario flags, said steering demand control being operative to generate a steering demand and said braking demand control being operative to generate a braking demand; and
   an application control device coupled to a mode control and acting as a mode switch for connecting the steering and braking demands produced by said steering demand control and said braking demand control to the vehicles EPS and VSC systems when said mode control indicates that the system is active.

4. A stability control system as claimed in claim 3, wherein in said steering demand control, said steering yaw rate demand is compared to feedback measurements of steering wheel angle and rotational rate to provide an assist steering column torque demand for transmission to the vehicle EPS system.

5. A stability control system as claimed in claim 4, wherein in said braking demand control, said braking yaw rate demand is compared to feedback estimates of brake pressures whereby to provide brake pressure demands for transmission to the vehicle VSC system.

6. A stability control system as claimed in claim 5 in which, in a split-µ stop, the driver is assisted to balance the yaw moment due to the asymmetric longitudinal braking force by demanding a torque to the steering system to assist the driver in achieving the required counter moment.

7. A stability control system as claimed in claim 6, wherein the system includes a video lane detection sensor and further wherein an additional torque to assist the driver correct for lane offsets detected by said video lane detection sensor is used to augment the first mentioned torque.

8. A stability control system as claimed in claim 5, in which in the case of an understeering vehicle condition detected by the vehicle VSC, an appropriate wheel is arranged to be braked to achieve a desired yaw rate in accordance with a driver's command expressed via the steering wheel, whereby to decelerate the vehicle to reduce the understeer.

9. A stability control system as claimed in claim 8, in which once the understeer has been reduced sufficiently for the front tyres to be no longer saturated, a torque is arranged to be demanded of the steering to assist the driver to correct for any lane offsets detected by a video lane detection sensor providing said video lane detection measurements.

10. A stability control system as claimed in claim 5, in which, for the purposes of preventative understeer or oversteer, the video lane detection measurements are used to obtain look-ahead information of a bend, the controller being arranged to demand brake intervention to decelerate the vehicle to an appropriate speed so that the bend can be safely negotiated without one of understeer and oversteer being provided.

11. A stability control system as claimed in claim 5 in which, in the case of an oversteering vehicle condition detected by the vehicle VSC, a torque is arranged to be applied to the steering to assist the driver in stabilising the vehicle following which, if the oversteer progresses to a threshold, the VSC is arranged to brake an appropriate wheel to stabilise the vehicle and achieve a desired yaw rate in accordance with a driver's command via the steering wheel.

12. A stability control system as claimed in claim 11, in which, during and subsequent to the oversteer correction phases of the oversteer control, an additional overlay torque is arranged to be demanded of the steering to assist the driver correct for lane offsets detected by a video lane detection sensor providing said video lane detection measurements.

13. A stability control system as claimed in claim 5 in which during heavy braking while running in a lane, a torque is demanded of the steering system using vehicle inertial, steering and video lane detection measurements to assist the driver to stabilise the vehicle and keep the vehicle in that lane when undergoing said braking.

14. A stability control system as claimed in claim 5, wherein the system includes a video lane detection sensor and further wherein when a lane change selected by the driver is detected by said video lane detection sensor in association with steering and vehicle inertial sensors, a torque is arranged to be demanded of the steering system to assist the driver in making the lane change.

15. A stability control system for road vehicles having an Active Torque Overlay (ATO) system and comprising a limit handling assistance controller which uses video lane detection measurements in conjunction with vehicle dynamics information, including inertial brakes and steering measurements to control the ATO system to assist the driver in stabilizing the vehicle and correcting for any lane offset prior to and during at least one of the conditions of understeer, oversteer, split-µ and heavy braking conditions, and lane changes.

* * * * *